US011868213B2

(12) United States Patent
Zheng et al.

(10) Patent No.: US 11,868,213 B2
(45) Date of Patent: Jan. 9, 2024

(54) INCREMENTAL BACKUP TO OBJECT STORE

(71) Applicant: NetApp Inc., Sunnyvale, CA (US)

(72) Inventors: Ling Zheng, Saratoga, CA (US); Atul Ramesh Pandit, Los Gatos, CA (US); Tijin George, Sunnyvale, CA (US); Ravindra Ramachandraiah Kuramkote, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 16/944,352

(22) Filed: Jul. 31, 2020

(65) Prior Publication Data

US 2021/0406129 A1 Dec. 30, 2021

Related U.S. Application Data

(60) Provisional application No. 63/044,413, filed on Jun. 26, 2020.

(51) Int. Cl.
*G06F 16/00* (2019.01)
*G06F 11/14* (2006.01)

(52) U.S. Cl.
CPC ...... *G06F 11/1451* (2013.01); *G06F 11/1458* (2013.01)

(58) Field of Classification Search
CPC ......................... G06F 11/1451; G06F 11/1458
USPC .......................................................... 707/646
See application file for complete search history.

(56) References Cited

U.S. PATENT DOCUMENTS

| | | | | |
|---|---|---|---|---|
| 9,015,123 | B1 * | 4/2015 | Mathew | G06F 16/178 707/646 |
| 10,416,923 | B1 * | 9/2019 | Kiran | G06F 3/067 |
| 10,628,444 | B1 * | 4/2020 | Yadav | G06F 11/1464 |
| 2008/0126445 | A1 * | 5/2008 | Michelman | G06F 11/1461 |
| 2009/0150123 | A1 | 6/2009 | Archibald et al. | |
| 2010/0077160 | A1 * | 3/2010 | Liu | G06F 11/1453 711/162 |
| 2016/0098323 | A1 | 4/2016 | Mutha | |
| 2016/0210306 | A1 * | 7/2016 | Kumarasamy | G06F 16/178 |
| 2016/0292074 | A1 * | 10/2016 | Awasthi | G06F 9/45558 |
| 2017/0366624 | A1 * | 12/2017 | Tsang | G06F 16/278 |
| 2018/0284986 | A1 * | 10/2018 | Bhagi | G06F 11/2056 |
| 2019/0384678 | A1 | 12/2019 | Samprathi et al. | |

OTHER PUBLICATIONS

Int. Search Report/Written Opinion cited in Application No. PCT/US2021/039283 dated Oct. 19, 2021, 13 pgs.
International Preliminary Report on Patentability corresponding to PCT/US2021-0039283; dated Dec. 13, 2022; 8 Pgs.

* cited by examiner

*Primary Examiner* — Monica M Pyo
(74) *Attorney, Agent, or Firm* — Cooper Legal Group, LLC

(57) ABSTRACT

Techniques are provided for incremental backup to an object store. A request may be received from an application to perform a backup from a volume hosted by a node to a backup target within the object store. A set of changed files within the volume since a prior backup of the volume was performed to the backup target is identified, along with metadata associated with the set of changed files. The metadata is utilized to identify changed data blocks comprising data of the set of changed files that was modified since the prior backup. The changed data blocks are backed up to the object store.

18 Claims, 10 Drawing Sheets

INCREMENTAL BACKUP TO OBJECT STORE

RELATED APPLICATIONS

This application claims priority to U.S. Provisional Patent Application, titled "INCREMENTAL BACKUP TO OBJECT STORE", filed on Jun. 26, 2020 and accorded Application No. 63/044,413, which is incorporated herein by reference.

BACKGROUND

A node may store and manage the storage of data on behalf of client devices within storage. For example, a volume may be created and maintained within the storage so that a client device can store and access data within the volume through the node. The data may be organized within the volume by a file system for read and write access by the client device through the node. Storage backup and redundancy may be provided by the node for the volume. For example, the node may create an initial full backup of the volume as a snapshot. The snapshot may be stored within different storage than the storage comprising the volume, such as within second storage of a second node. After the full backup is created, incremental backups of changed data within the volume may be created as incremental snapshots. In this way, the volume may be restored to a particular state by restoring data from the snapshot and/or one or more select incremental snapshots of the volume to the volume.

DETAILED DESCRIPTION

Figure 1:
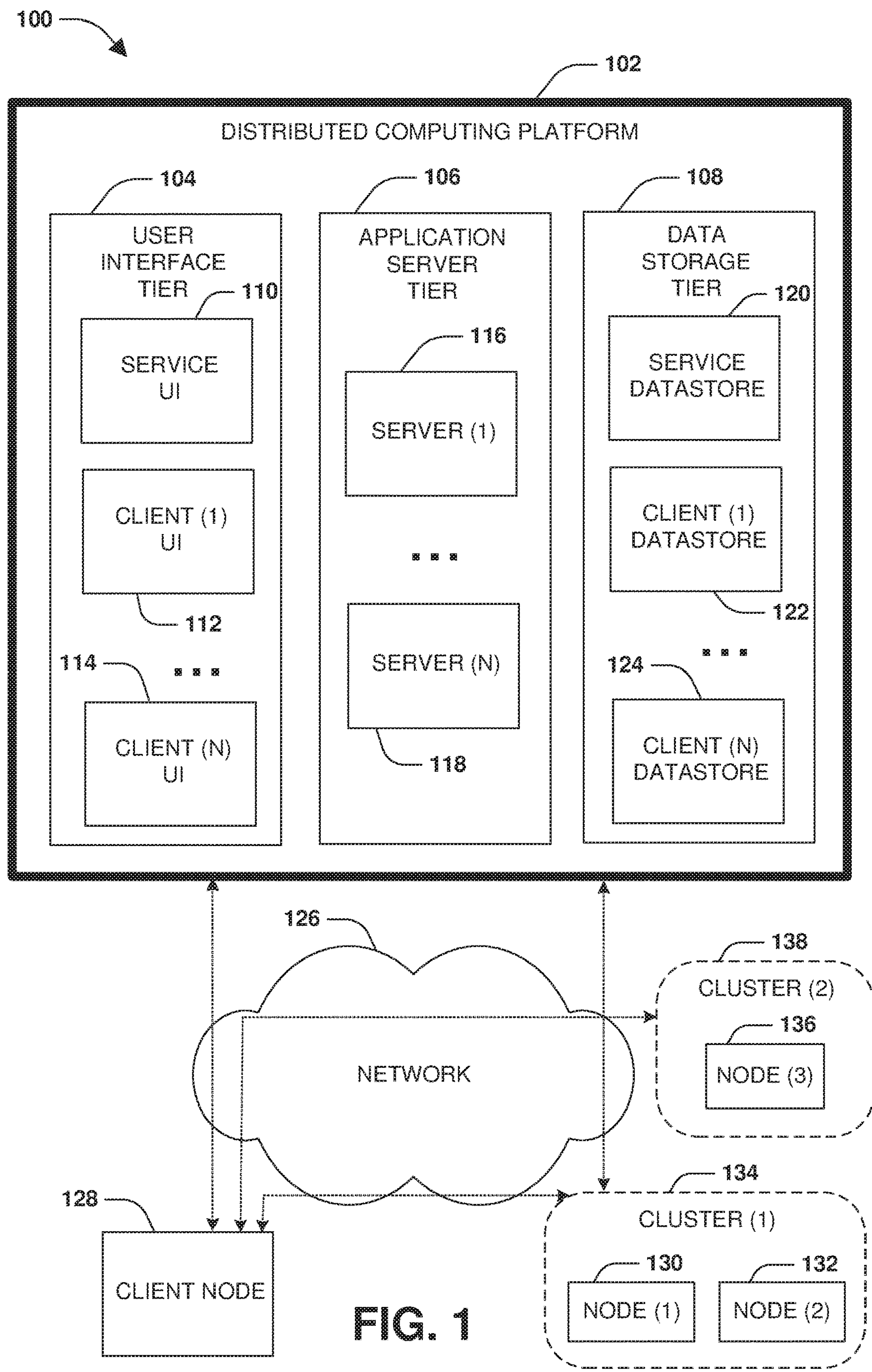
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

The techniques described herein are directed to a backup framework of application programming interfaces (APIs) that can be invoked by an application (e.g., a 3$^{rd}$ party backup application) to backup data of a volume from a node (e.g., an on-premise filer) to an object store such as a cloud computing environment. The backup framework is capable of performing backup and restores at a data block level of granularity as opposed to a file level granularity. The ability to merely backup and restore changed data blocks reduces processing and network resource utilization otherwise wasted when entire changed files are backed up and restored (e.g., merely a few data blocks may be changed within a large file, and thus only those few data blocks are backed up instead of the entire large file).

The backup framework is capable of scaling out to support a large number of incremental backups that other backup protocols such as a network data management protocol (NDMP) cannot support. Such backup protocols cannot scale out to support a large number of incremental backups because restore of the volume becomes too complex, challenging, and time consuming for the backup protocols when a large number of incremental backups are involved in the restoration. Furthermore, the backup framework is capable of preserving storage efficiency provided by the node for the volume, such as compression and deduplication. In this way, the APIs of the backup framework enable incremental backup to and restore from cloud in a scalable manner that preserves storage efficiency of deduplication and compression and supports a large number of incremental backups and reduces network bandwidth and processing resources of backups and restores since merely changed data blocks are transferred.

With respect to prior backup frameworks and protocols, a 3$^{rd}$ party backup application may utilize NDMP to coordinate between nodes (e.g., filers such as network attached storage (NAS) filers), backup applications, and backup media. When a backup is triggered through NDMP, a dump program running within the node (e.g., a dump program of a storage operating system) will either perform a full backup or an incremental backup. Generally, a full backup is initially performed, and then any number of incremental backups are subsequently performed until another full backup is created. For example, full backups may be performed at certain intervals, while incremental backups may be performed between the full backups. However, NDMP has scaling issues where if the incremental backups become too large and numerous between full backups, then the ability to perform a restore is challenging, complex, and time consuming because of the potentially larger number of incremental backups that may need to be processed in order to obtain a desired restore point. Thus, NDMP cannot scale out to a large number of incremental backups.

To circumvent the scalability issues of NDMP, prior backup APIs were used to perform backups from the node to a backup destination. These prior backup APIs are inefficient because they can only backup entire changed files even though merely a portion of a changed file, such as a few changed blocks, may have changed since a prior backup, thus wasting processing and network resources. Furthermore, these prior backup APIs require a client agent to read the change files, which wastes computing resources of a client device. The client agent is unable to preserve storage efficiency provided by node, such as deduplication and compression.

Accordingly, as provided herein, a backup framework with storage APIs (e.g., a snapshot difference API and a copy to object store API) is configured to provide incremental backup from a node (e.g., an on-premise device, a server, a virtual machine, a filer, etc.) to an object store (e.g., a cloud computing environment hosted by a 3rd party cloud storage provider) and restore (e.g., volume level restore, file level restore, data block restore, etc.) from the object store to the node. The backup framework performs incremental back and restore in an efficient manner that preserves storage efficiencies provided by the node such as deduplication and compression. A third party backup application can access a storage operating system of the node using a first API (e.g., the snapshot difference API used to identify differences between backups/snapshots such as a difference between a current state of a volume and a prior snapshot of the volume) to identify changed files of the volume hosted by the node, along with identifying metadata of the changed files such as inodes (inode numbers) of the changed files.

Unlike prior backup APIs where a client agent at a client device would have to read the changed files and transmit the entire changed files to the object store for backup, now the first API is used to invoke the storage operating system to perform the backup by utilizing a second API (e.g., the copy to object store API) to identify changed data blocks of the changed files and transmit merely the changed data blocks to the object store for backup, and similarly for restore. Because the storage operating system of the node is performing the backup and restore at a block level using the second API (e.g., snapshot mirroring functionality of the second API), as opposed to the client agent performing the backup and restore at the file level, the storage operating system is able to preserve deduplication and compression while reducing processing and network resources otherwise wasted by the client agent in transmitting entire changed files to the object store, such as where merely a few blocks might have been changed within a changed file.

In this way, the techniques provided herein relate to providing applications (e.g., backup vendors) with the ability to efficiently backup changed data blocks (as opposed to prior techniques that could only backup whole changed files) from a volume to a destination object store (e.g., cloud storage) by invoking storage APIs that can use metadata of files within the volume (e.g., inodes/inode numbers of the files) as input into storage operating system functionality (e.g., snapshot mirroring functionality may perform the actual transfer as opposed to a client agent on a client device) that performs the actual transfer of the changed data blocks to the destination object store (and restoration back to the volume) in a manner that can preserve storage efficiencies like deduplication and compression that could not be preserved by prior techniques. The techniques provided herein address the scalability issues of NDMP and inefficiencies of prior backup APIs from a client side perspective by utilizing these storage APIs to read changed data blocks of changed files within a volume and transfer those changed data blocks to an object store. This technique can scale to accommodate the storage of any number of incremental snapshots within the destination object store without restriction. Furthermore, the storage APIs may be disassociated with actual backup streams and credentials of the destination object store, and thus applications and users of the storage APIs may be isolated from accessing data within the volume, thus improving data privacy.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an decompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
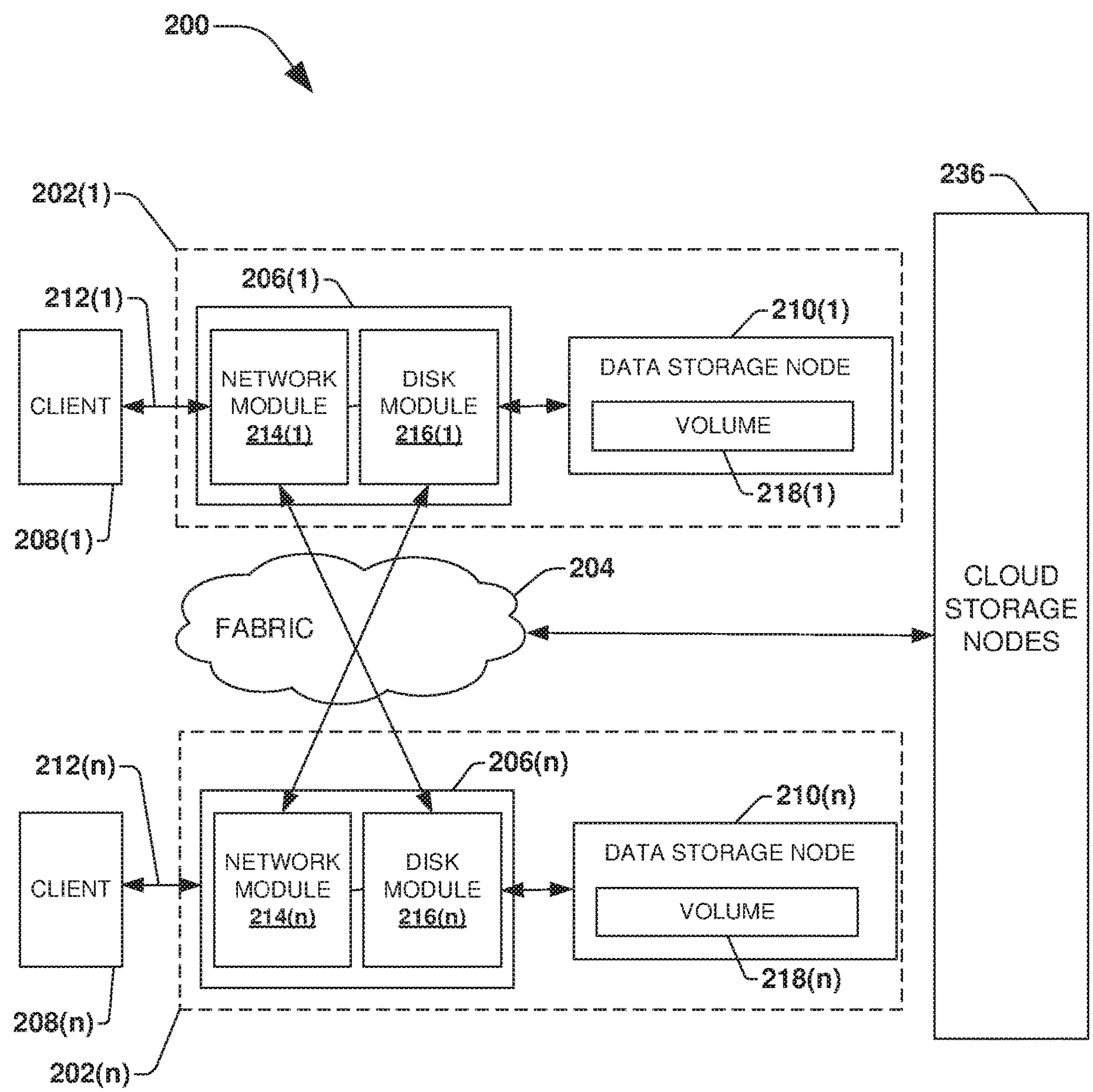
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(*n*) that are coupled over a cluster or cluster fabric 204 that includes one or more communication network(s) and facilitates communication between the data storage apparatuses 202(1)-202(*n*) (and one or more modules, components, etc. therein, such as, node computing devices 206(1)-206(*n*), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(*n*) can be primary or local storage controllers or secondary or remote storage controllers that provide client devices 208 (1)-208(*n*) with access to data stored within data storage devices 210(1)-210(*n*) and cloud storage device(s) 236 (also referred to as cloud storage node(s)). The node computing devices 206(1)-206(*n*) may be implemented as hardware, software (e.g., a storage virtual machine), or combination thereof.

The data storage apparatuses 202(1)-202(*n*) and/or node computing devices 206(1)-206(*n*) of the examples described and illustrated herein are not limited to any particular geographic areas and can be clustered locally and/or remotely via a cloud network, or not clustered in other examples. Thus, in one example the data storage apparatuses 202(1)-202(*n*) and/or node computing device 206(1)-206(*n*) can be distributed over a plurality of storage systems located in a plurality of geographic locations (e.g., located on-premise, located within a cloud computing environment, etc.); while in another example a clustered network can include data storage apparatuses 202(1)-202(*n*) and/or node computing device 206(1)-206(*n*) residing in a same geographic location (e.g., in a single on-site rack).

In the illustrated example, one or more of the client devices 208(1)-208(*n*), which may be, for example, personal computers (PCs), computing devices used for storage (e.g., storage servers), or other computers or peripheral devices, are coupled to the respective data storage apparatuses 202 (1)-202(*n*) by network connections 212(1)-212(*n*). Network connections 212(1)-212(*n*) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(*n*) may be general-purpose computers running applications and may interact with the data storage apparatuses 202(1)-202(*n*) using a client/server model for exchange of information. That is, the client devices 208(1)-208(*n*) may request data from the data storage apparatuses 202(1)-202(*n*) (e.g., data on one of the data storage devices 210(1)-210(*n*) managed by a network storage controller configured to process I/O commands issued by the client devices 208(1)-208(*n*)), and the data storage apparatuses 202(1)-202(*n*) may return results of the request to the client devices 208(1)-208(*n*) via the network connections 212(1)-212(*n*).

The node computing devices 206(1)-206(*n*) of the data storage apparatuses 202(1)-202(*n*) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206 (*n*) can be attached to the cluster fabric 204 at a connection point, redistribution point, or communication endpoint, for example. One or more of the node computing devices 206(1)-206(*n*) may be capable of sending, receiving, and/or forwarding information over a network communications channel, and could comprise any type of device that meets any or all of these criteria.

In an example, the node computing devices 206(1) and 206(*n*) may be configured according to a disaster recovery configuration whereby a surviving node provides switchover access to the storage devices 210(1)-210(*n*) in the event a disaster occurs at a disaster storage site (e.g., the node computing device 206(1) provides client device 212(*n*) with switchover data access to data storage devices 210(*n*) in the event a disaster occurs at the second storage site). In other examples, the node computing device 206(*n*) can be configured according to an archival configuration and/or the node computing devices 206(1)-206(*n*) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(*n*) can include various functional components that coordinate to provide a distributed storage architecture. For example, the node computing devices 206(1)-206(*n*) can include network modules 214(1)-214(*n*) and disk modules 216(1)-216(*n*). Network modules 214(1)-214(*n*) can be configured to allow the node computing devices 206(1)-206(*n*) (e.g., network storage controllers) to connect with client devices 208(1)-208(*n*) over the storage network connections 212(1)-212(*n*), for example, allowing the client devices 208(1)-208(*n*) to access data stored in the clustered network environment 200.

Further, the network modules 214(1)-214(*n*) can provide connections with one or more other components through the cluster fabric 204. For example, the network module 214(1) of node computing device 206(1) can access the data storage device 210(*n*) by sending a request via the cluster fabric 204 through the disk module 216(*n*) of node computing device 206(*n*) when the node computing device 206(*n*) is available. Alternatively, when the node computing device 206(*n*) fails, the network module 214(1) of node computing device 206(1) can access the data storage device 210(*n*) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(*n*) can be configured to connect data storage devices 210(1)-210(*n*), such as disks or arrays of disks, SSDs, flash memory, or some other form of data storage, to the node computing devices 206(1)-206(*n*). Often, disk modules 216(1)-216(*n*) communicate with the data storage devices 210(1)-210(*n*) according to the SAN protocol, such as SCSI or FCP, for example, although other protocols can also be used. Thus, as seen from an operating system on node computing devices 206(1)-206(*n*), the data storage devices 210(1)-210(*n*) can appear as locally attached. In this manner, different node computing devices 206(1)-206(*n*), etc. may access data blocks, files, or objects through the operating system, rather than expressly requesting abstract files.

While the clustered network environment 200 illustrates an equal number of network modules 214(1)-214(*n*) and disk modules 216(1)-216(*n*), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(*n*) can be networked with the node computing devices 206(1)-206(*n*) in the cluster, over the storage connections 212(1)-212(*n*). As an example, respective client devices 208(1)-208(*n*) that are networked to a cluster may request services (e.g., exchanging of information in the form of data packets) of node computing devices 206(1)-206(*n*) in the cluster, and the node computing devices 206(1)-206(*n*) can return results of the requested services to the client devices 208(1)-208(*n*). In one example, the client devices 208(1)-208(*n*) can exchange information with the network modules 214(1)-214(*n*) residing in the node computing devices 206(1)-206(*n*) (e.g., network hosts) in the data storage apparatuses 202(1)-202(*n*).

In one example, the storage apparatuses 202(1)-202(*n*) host aggregates corresponding to physical local and remote data storage devices, such as local flash or disk storage in the data storage devices 210(1)-210(*n*), for example. One or more of the data storage devices 210(1)-210(*n*) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(*n*) in this example, although any number of volumes can be included in the aggregates. The volumes 218(1)-218(*n*) are virtual data stores or storage objects that define an arrangement of storage and one or more filesystems within the clustered network environment 200. Volumes 218(1)-218(*n*) can span a portion of a disk or other storage device, a collection of disks, or portions of disks, for example, and typically define an overall logical arrangement of data storage. In one example volumes 218(1)-218(*n*) can include stored user data as one or more files, blocks, or objects that may reside in a hierarchical directory structure within the volumes 218(1)-218(*n*).

Volumes 218(1)-218(*n*) are typically configured in formats that may be associated with particular storage systems, and respective volume formats typically comprise features that provide functionality to the volumes 218(1)-218(*n*), such as providing the ability for volumes 218(1)-218(*n*) to form clusters, among other functionality. Optionally, one or more of the volumes 218(1)-218(*n*) can be in composite aggregates and can extend between one or more of the data storage devices 210(1)-210(*n*) and one or more of the cloud storage device(s) 236 to provide tiered storage, for example, and other arrangements can also be used in other examples.

In one example, to facilitate access to data stored on the disks or other structures of the data storage devices 210(1)-210(*n*), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(*n*) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(*n*) can have one or more physical ports, wherein each physical port can be assigned a target address (e.g., SCSI target address). To represent respective volumes, a target address on the data storage devices 210(1)-210(*n*) can be used to identify one or more of the LUNs. Thus, for example, when one of the node computing devices 206(1)-206(*n*) connects to a volume, a connection between the one of the node computing devices 206(1)-206(*n*) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
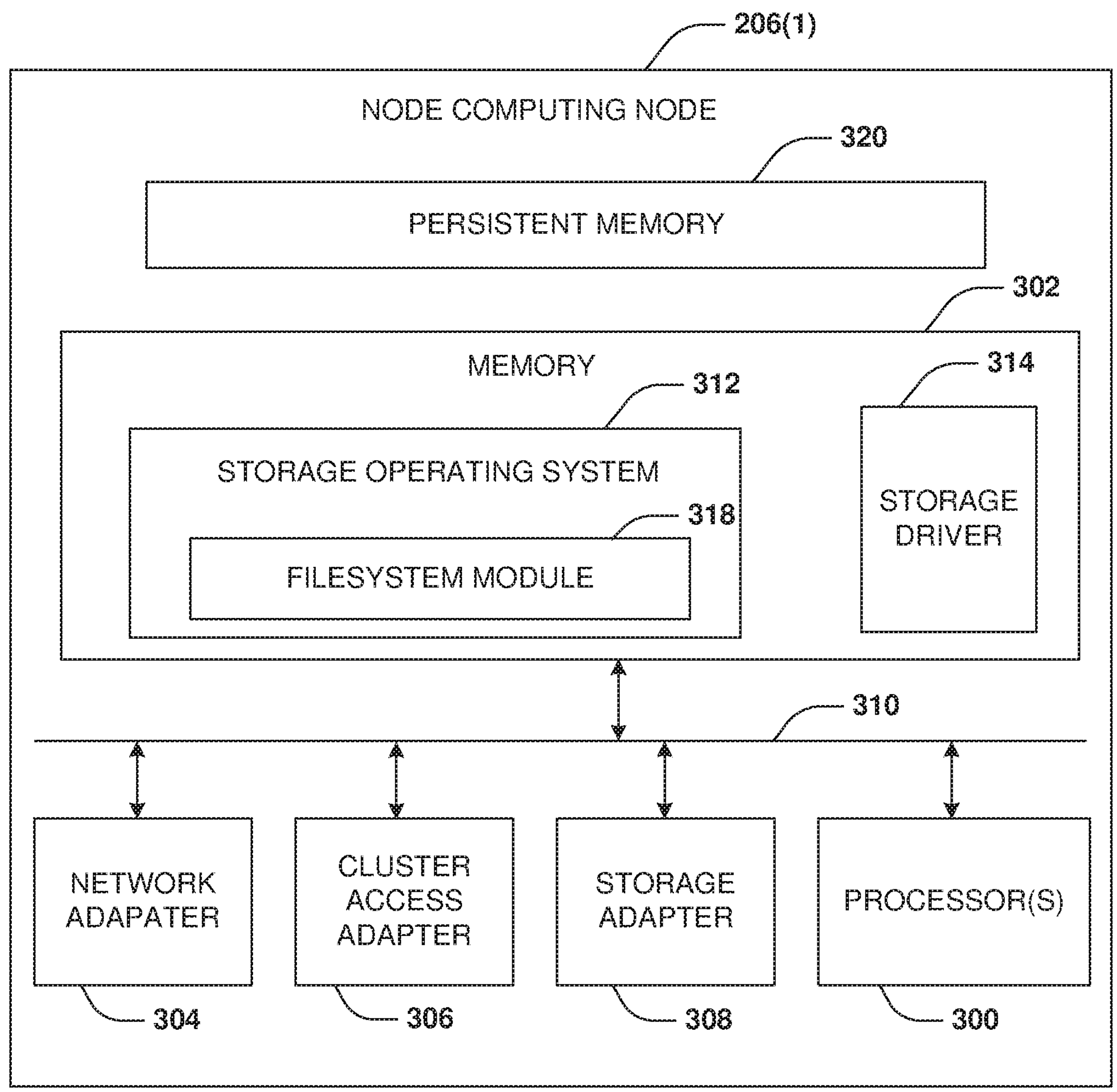
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(*n*) is substantially the same in structure and/or operation as node computing device 206(1), although the node computing device 206(*n*) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(*n*) over network connections 212(1)-212(*n*), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(*n*) (e.g., to access data on a data storage device 210(1)-210(*n*) managed by a network storage controller). The information may be stored on any type of attached array of writeable media such as magnetic disk drives, flash memory, and/or any other similar media adapted to store information.

In the exemplary data storage devices 210(1)-210(*n*), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(*n*) and/or sent to another node computing device attached via the cluster fabric 204. In some examples, a storage driver 314 in the memory 302 interfaces with the storage adapter to facilitate interactions with the data storage devices 210(1)-210(*n*).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(*n*) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

In the example, the node computing device 206(1) comprises persistent memory 320. The persistent memory 320 comprises a plurality of pages within which data can be stored. The plurality of pages may be indexed by page block numbers.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
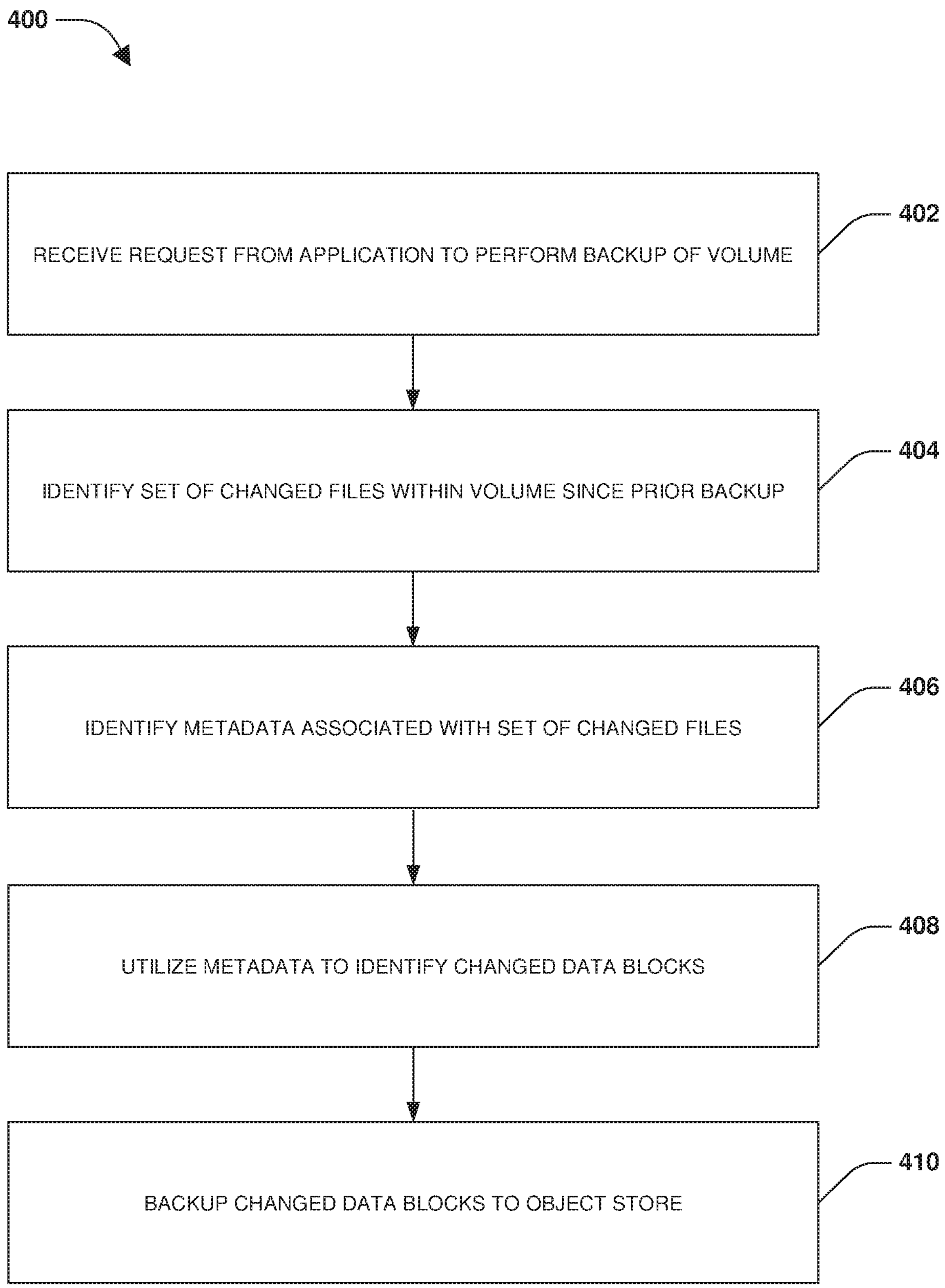
FIG. 4 is a flow chart illustrating an example method for incremental backup to object store.
Figure 5A:
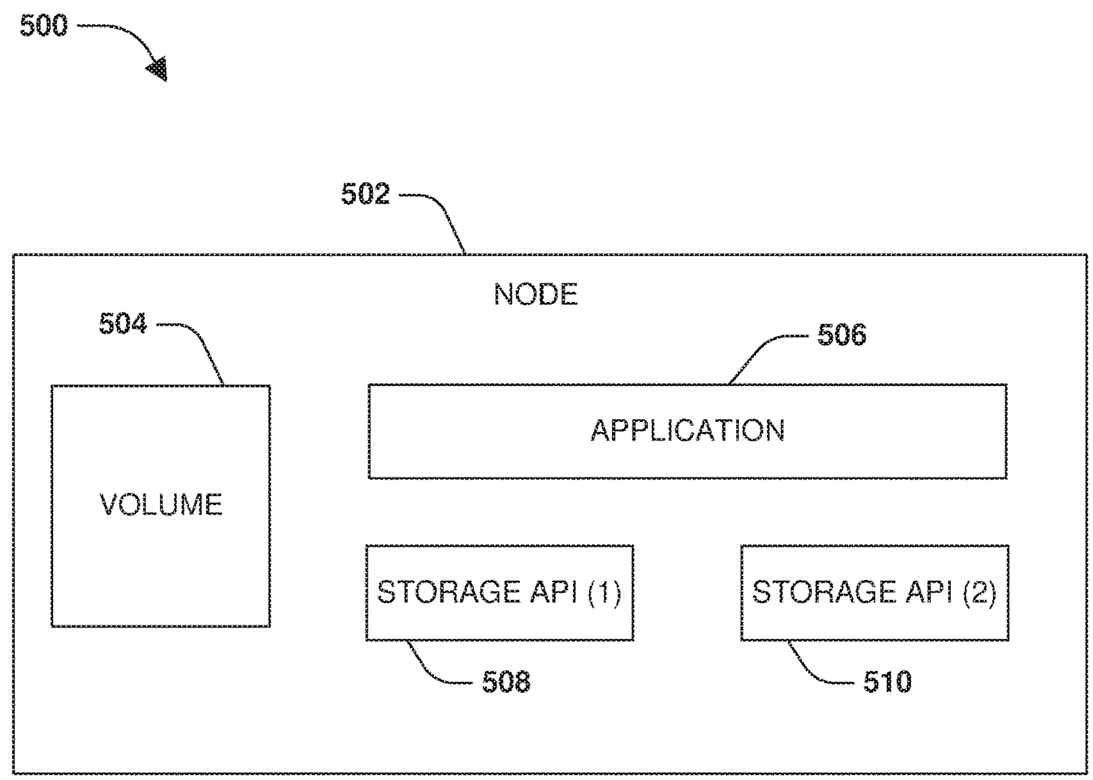
FIG. 5A is a block diagram illustrating an example system for incremental backup to object store.
Figure 5A:
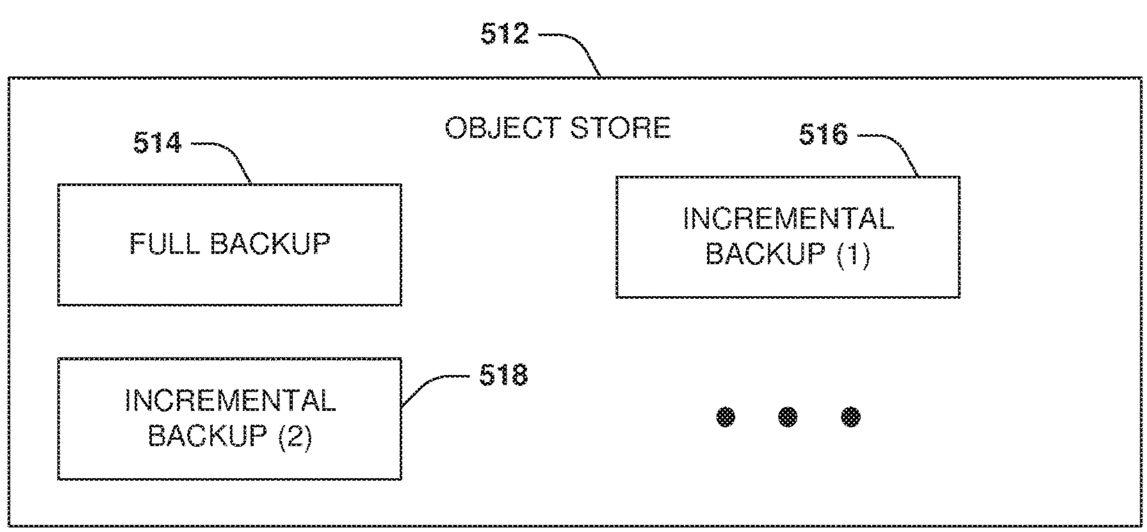

One embodiment of incremental backup to an object store is illustrated by an exemplary method 400 of FIG. 4, which is further described in conjunction with system 500 of FIGS. 5A-5E. A node 502 may comprise a computing device, an on-premise device, a virtual machine, a filer (e.g., a NAS filer or other type of filer), a storage controller, hardware, software, or combination thereof, as illustrated by FIG. 5A. The node 502 may provide storage functionality for client devices, such as storage access functionality to store and retrieve data within volumes such as a volume 504 (e.g., data may be organized within the volume and accessible to client devices through a file system associated with the volume 504), data compression, data deduplication, data redundancy, etc. Such storage functionality may be provided by a storage operating system of the node 502. An application 506 (e.g., a 3rd party backup application that manages cloud storage backups to an object store 512) may provide backup functionality for the volume 504 utilizing the object store 512, such as a cloud computing/storage environment. The application 506 may be hosted by the node 502 or may be hosted remote to the node 502, such as at a client device or other computing device. That is, even though the application 506 is depicted as being implemented at the node 502 in FIG. 5A for illustrative purposes, the application 506 could be hosted elsewhere outside of the node 502, such as at a remote computing device connected to the node 502 over a network. Unfortunately, the application 506 may lack the ability to identify changed files and/or changed data blocks within the volume 504 in order to back up merely the changed files and/or the changed data blocks from the volume 504 to the object store 512.

Accordingly, as provided herein, a backup framework is implemented with a first storage API 508 (e.g., a snapshot difference API that is storage API external to the application 506) and a second storage API 510 (e.g., a copy to object store API that is storage API external to the application 506) for performing incremental backups and restores between the volume 504 of the node 502 and the object store 512 on behalf of the application 506. In an embodiment, the first storage API 508 and the second storage API 510 are implemented as separate APIs. In another embodiment, the first storage API 508 and the second storage API 510 may be implemented as the same API.

The first storage API 508 may be hosted by the node 502. The first storage API 508 may be capable of identifying changed files within the volume 504 that have changed since a prior backup. In an example, the first storage API 508 may identify the changed files based upon differences between two snapshots of the volume 504 (e.g., a current snapshot of the volume 504 and a prior snapshot of the volume 504 used for the prior back). The first storage API 508 may be capable of identifying metadata associated with the changed files, such as inodes/inode numbers of the changed files. The second storage API 510 may be hosted by the node 502. The second storage API 510 may be capable of identifying changed blocks within storage used to store the volume 504. The second storage API 510 may be capable of reading the changed blocks of the volume 504 from the storage. The second storage API 510 may be capable of transmitting the changed blocks over a network to the object store 512 for storage within a backup (e.g., a snapshot), such as an incremental backup.

In an embodiment, a full backup 514 of the volume 504 may be performed. The full backup 514 may comprise all the data blocks of the volume 504. In an example, the full backup 514 comprises a snapshot corresponding to a point in time representation of the volume 504. The full backup 514 may be transmitted from the node 502 to the object store 512 for storage. After the full backup 514 is stored within the object store 512, one or more incremental backups of the volume 504 may be created, such as a first incremental backup 516, a second incremental backup 518, and/or other incremental backups. In an embodiment, an incremental backup may correspond to an incremental snapshot of the volume 504. An incremental backup may comprise changes (e.g., changed data block) of the volume 504 since a prior backup. For example, the first incremental backup 516 may comprise changes to the volume 504 since the full backup 514. The second incremental backup 518 may comprise changes to the volume 504 since the first incremental backup 516. The node 502 may transmit the incremental backups to the object store 512 for storage.

Figure 5B:
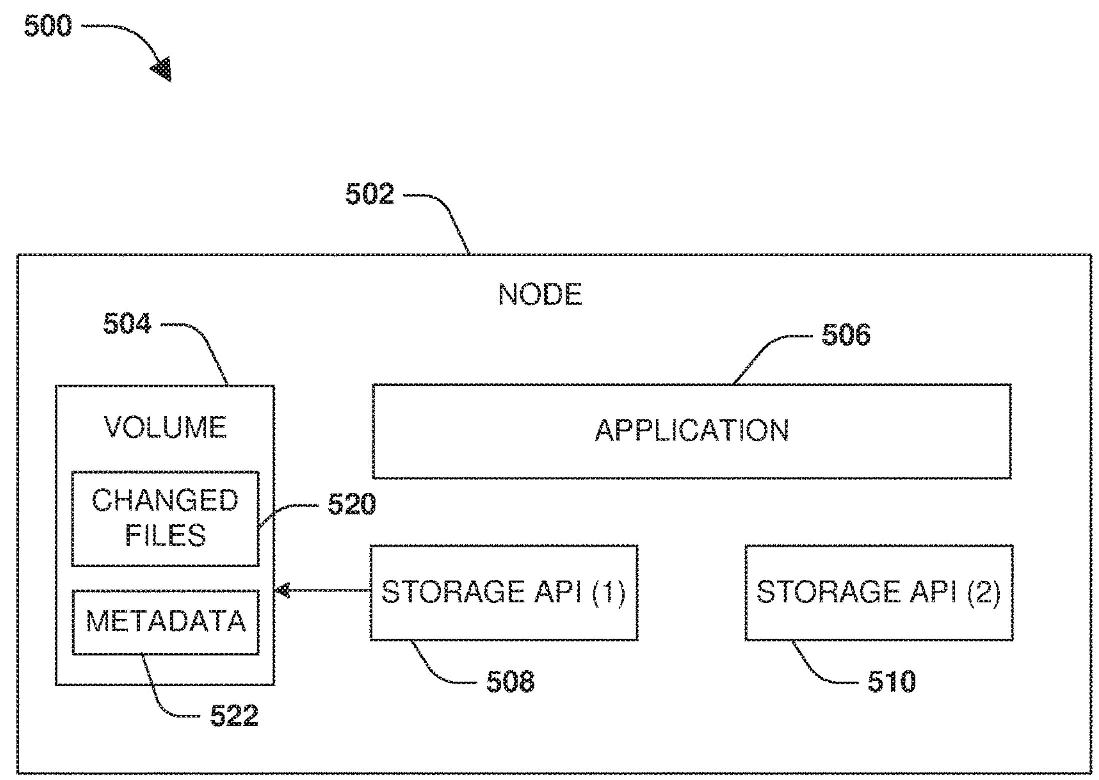
FIG. 5B is a block diagram illustrating an example system for incremental backup to object store, where changed files within a volume and metadata of the changed files are identified.
Figure 5B:
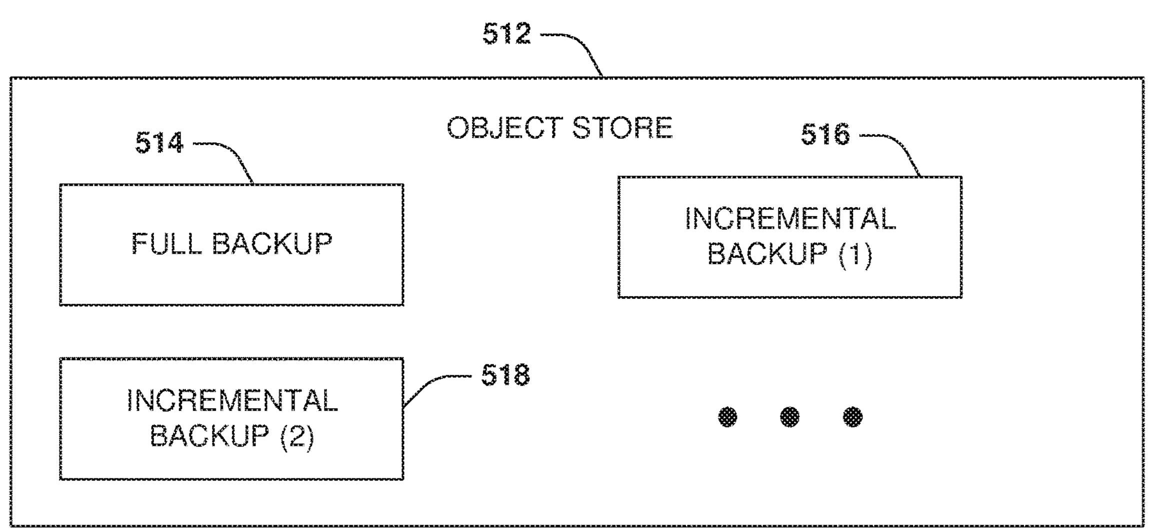

In an embodiment of creating a new incremental backup of the volume 504, a request is received, at 402 of the method 400 of FIG. 4, from the application 506 to perform a backup of the volume 504 hosted by the node 502 to a backup target within the object store 512, as illustrated by FIG. 5B. In order for the application 506 to initiate backs from the volume 504 hosted by the node 502 to the object store 512 and restores from the object store 512 to the volume 504, an application programming interface (API) token is generated. The API token may comprise licensing information such as a license key granting the application 506 access to the first storage API 508 and/or the second storage API 510. The API token may comprise a user name (e.g., a partner/customer name) and a flag to indicate whether the user is exempt from being required to have a separate cloud backup capacity license. The license key of the API token may comprise a signature used to avoid tampering (e.g., the first storage API 508 and the second storage API 510 may verify the signature before performing any operations on behalf of the application 506). When the application 506 interacts with the node 502, the first storage API 508, and/or the second storage API 510, the application 506 may include the API token within such communication (e.g., within REST API calls) for verification purposes in order to validate as to whether the application 506 is allowed to have the first storage API 508 and/or the second storage API 510 orchestrate backup and restore operations on behalf of the application 506. Validation and invalidation of the API token may be logged within a log. The API token may be invalid if the license key is expired or invalid. In an embodiment, the API token may comprise a cloud backup capacity license for using the object store 512. In this way, the request from the application 506 may comprise the API token, which is validated to ensure the application 506 has permission to invoke the backup of the volume 504 to the object store 512.

In order to perform the backup, a backup target is added to the object store as a destination for backups from the node 502 to the object store 512. For example, the full backup 514, the first incremental backup 516, and/or the second incremental backup 518 may be stored within the backup target of the object store 512. Additionally, a backup policy is generated for the object store 512. The backup policy may comprise one or more backup attributes for backing up data from the node 502 to the object store 512. The backup attributes may comprise a schedule for executing backup operations, a number of backup copies to retain within the object store 512 (e.g., an oldest backup may be removed from the object store 512 to make room for a new backup if the number of backup copies to retain has been reached), etc. A backup policy may be attached to a backup relationship. The backup relationship may specify that the volume 504 is a backup source and that the object store 512 is a backup destination. In this way, the backup target, the backup policy, and the backup relationship are utilized by the first storage API 508 and/or the second storage API 510 for backing up data of the volume 504 to the backup target within the object store 512.

In response to receiving the request from the application 506 and validating the API token, the first storage API 508 may identify a set of changed files 520 within the volume 504 since a prior backup of the volume 504 was performed to the backup target of the object store 512, at 404. For example, the first storage API 508 may comprise functionality capable of comparing a prior backup (e.g., a full backup/snapshot or an incremental backup/snapshot, such as the second incremental backup 518) of the volume 504 to a current state of the volume 504 (e.g., a current snapshot of the volume 504 captured at a point in time corresponding to receiving the request and/or initiating a backup procedure to perform the backup) in order to identify the set of changed files 520 within the volume 504. The set of changed files 520 within the volume 504 may be reported to the application 506 by the first storage API 508. The first storage API 508 may identify metadata 522 associated with the set of changed files 520 within the volume 504, at 406. The metadata 522 may comprise inodes/inode numbers of the set of changed files 520, which may be used by the second storage API 510 to identify changed data blocks of the changed files 520 that were modified since the prior backup of the volume 504. The metadata 522 may be reported to the application 506

Figure 5C:
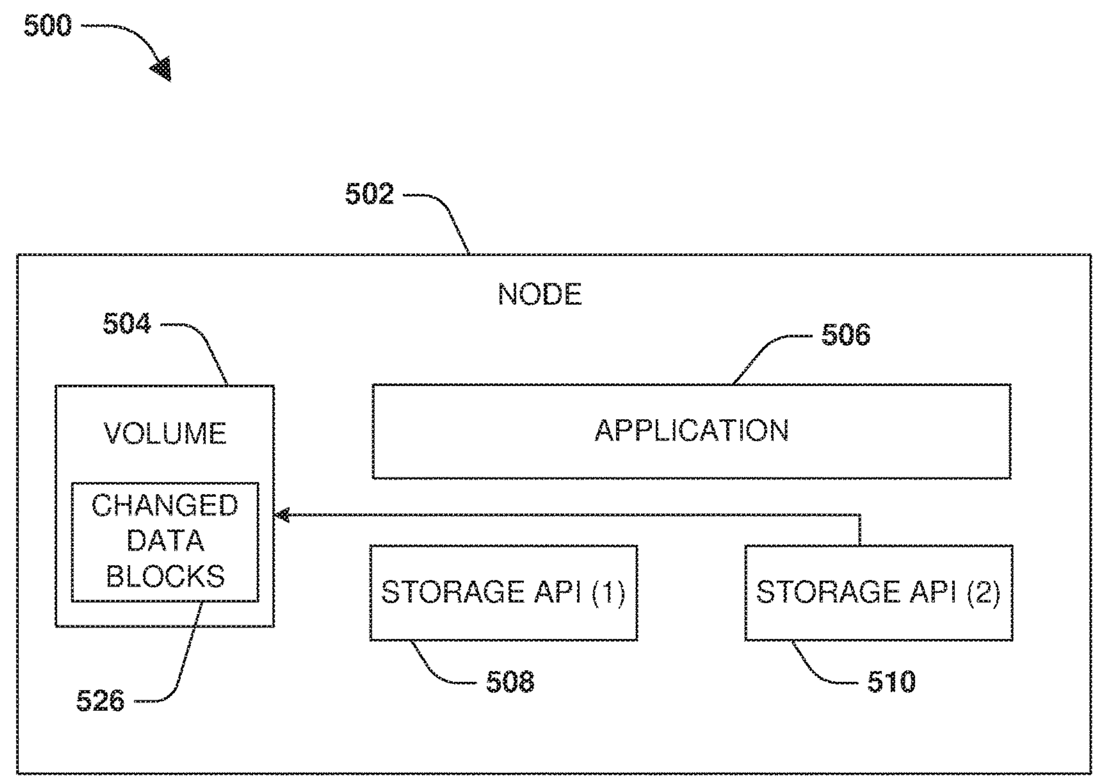
FIG. 5C is a block diagram illustrating an example system for incremental backup to object store, where changed data blocks of changed files are identified.
Figure 5C:
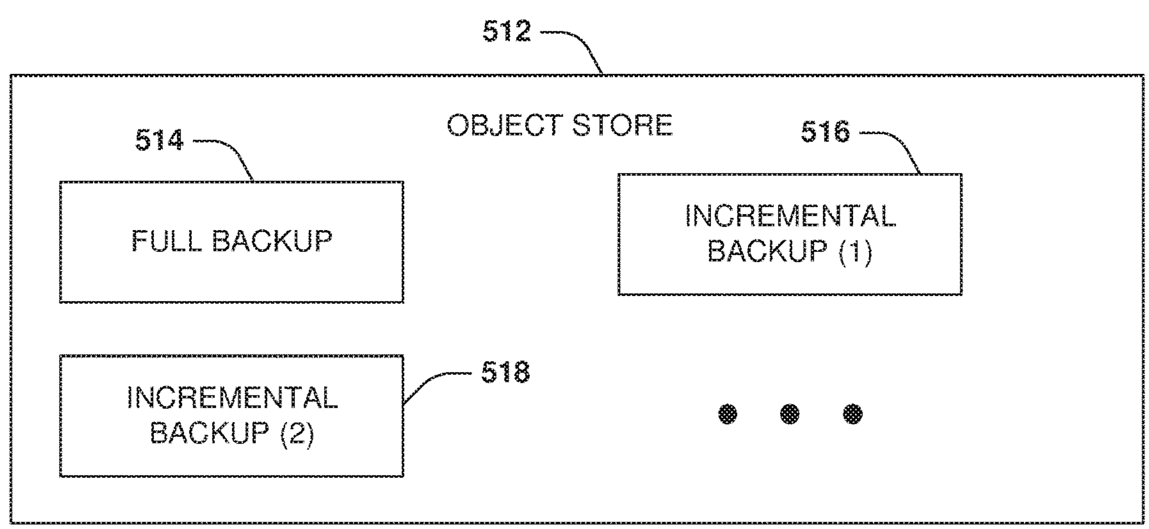

At 408, the second storage API 510 may be invoked by the application 506 and/or the first storage API 508 to identify the changed data blocks 526 within storage used by the node 502 to store data of the volume 504 within data blocks, as illustrated by FIG. 5C. For example, the second storage API 510 may utilize the inodes of the changed files to access the storage operating system of the node 502 and the file system of the volume 504 in order to evaluate data blocks within the storage to identify the changed data blocks 526 that were modified since the prior backup of the volume 504 (e.g., the second incremental backup 518) to the object store 512. In this way, the changed data blocks 526 within the volume 504 are identified by the second storage API 510 so that a block level backup of the volume 504 to the object store 512 can be performed as opposed to a file level backup that would waste processing and network bandwidth in transferring non-modified data blocks of the set of changed files 520.

Figure 5D:
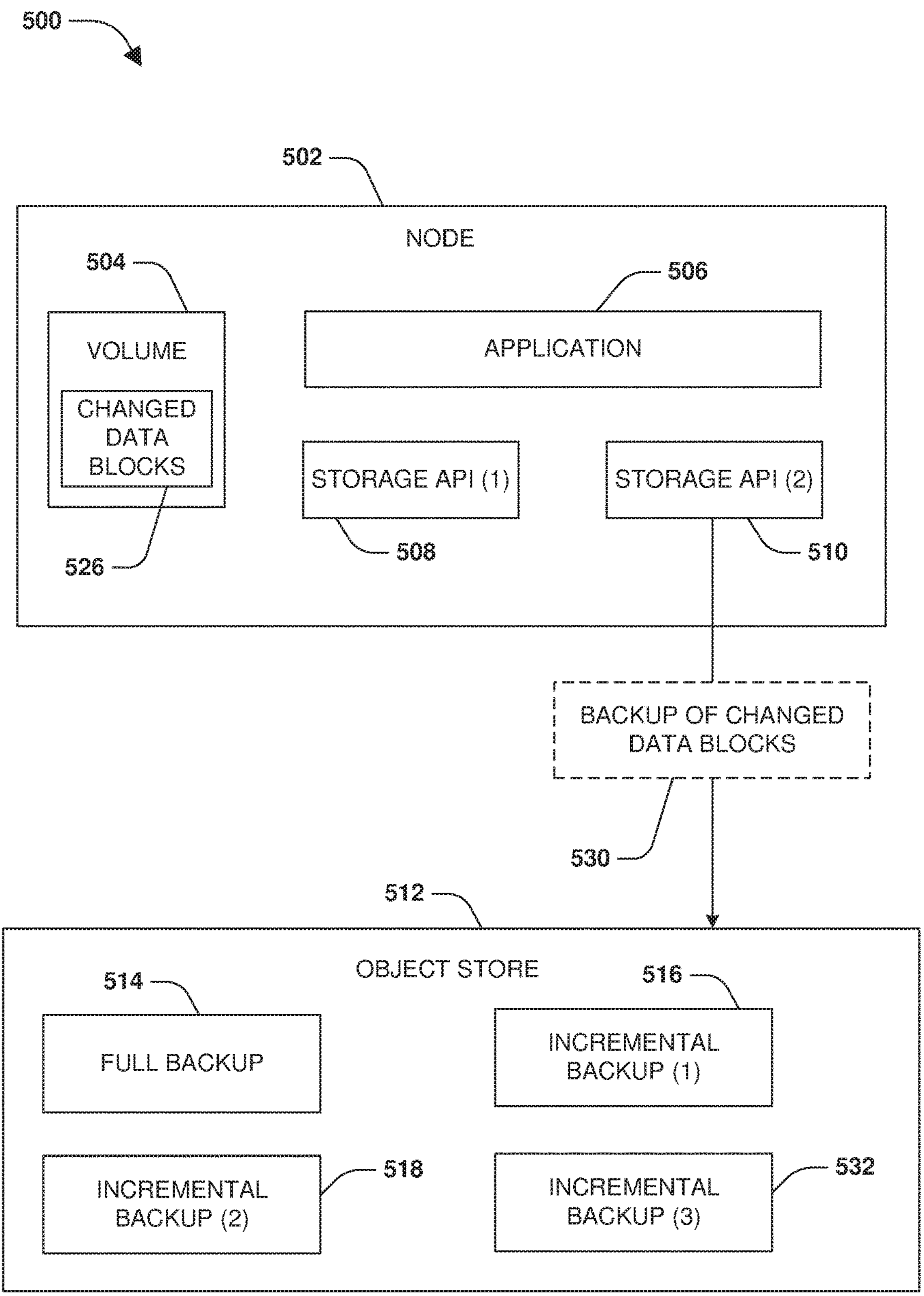
FIG. 5D is a block diagram illustrating an example system for incremental backup to object store, where a backup is performed to the object store.

A 410, the second storage API 510 performs a backup 530 of the changed data blocks 526 to the object store 512, as illustrated by FIG. 5D. In an example, the backup 530 of the changed data blocks 526 is performed to create a third incremental backup 532 within the backup target of the object store 512 (e.g., a third incremental snapshot of the volume 504). The third incremental backup 532 may correspond to a data differences of the volume 504 since the second incremental backup 518 was created as the prior backup. As part of performing the backup 530, the second storage API 510 reads the changed data blocks 526 from the storage. The second storage API 510 transmits the changed data blocks 526 to the object store 512 to create the third incremental backup 532 at the backup target within the object store 512 based upon the backup policy and backup relationship specifying that the volume 504 is the backup source and the object store 512 and backup target are the backup destination. Accordingly, processing and network resources are conserved by merely transferring the changed data blocks 526 to the object store 512 as the third incremental backup 532 because the second storage API 510 is capable of perform a block level backup to the object store 512.

Because the second storage API 510 is capable of performing the block level backup of the changed data blocks 526 to the object store 512, storage efficiency provided for the volume 504 by the node 502 may be preserved. In an embodiment, the second storage API 510 is capable of preserving deduplication that may have been performed upon data of the volume 504 in order to remove duplicate data of the volume 504 from storage. Thus, storage efficiency savings provided by deduplication are preserved for the third incremental backup 532 in order to reduce storage utilized within the object store 512 to store the third incremental backup 532. In an embodiment, the second storage API 510 is capable of preserving compression that may have been performed upon data of the volume 504 in order to compress the data of the volume 504. Thus, storage efficiency savings provided by compression are preserved for the third incremental backup 532 in order to reduce storage utilized within the object store 512 to store the third incremental backup 532.

Figure 5E:
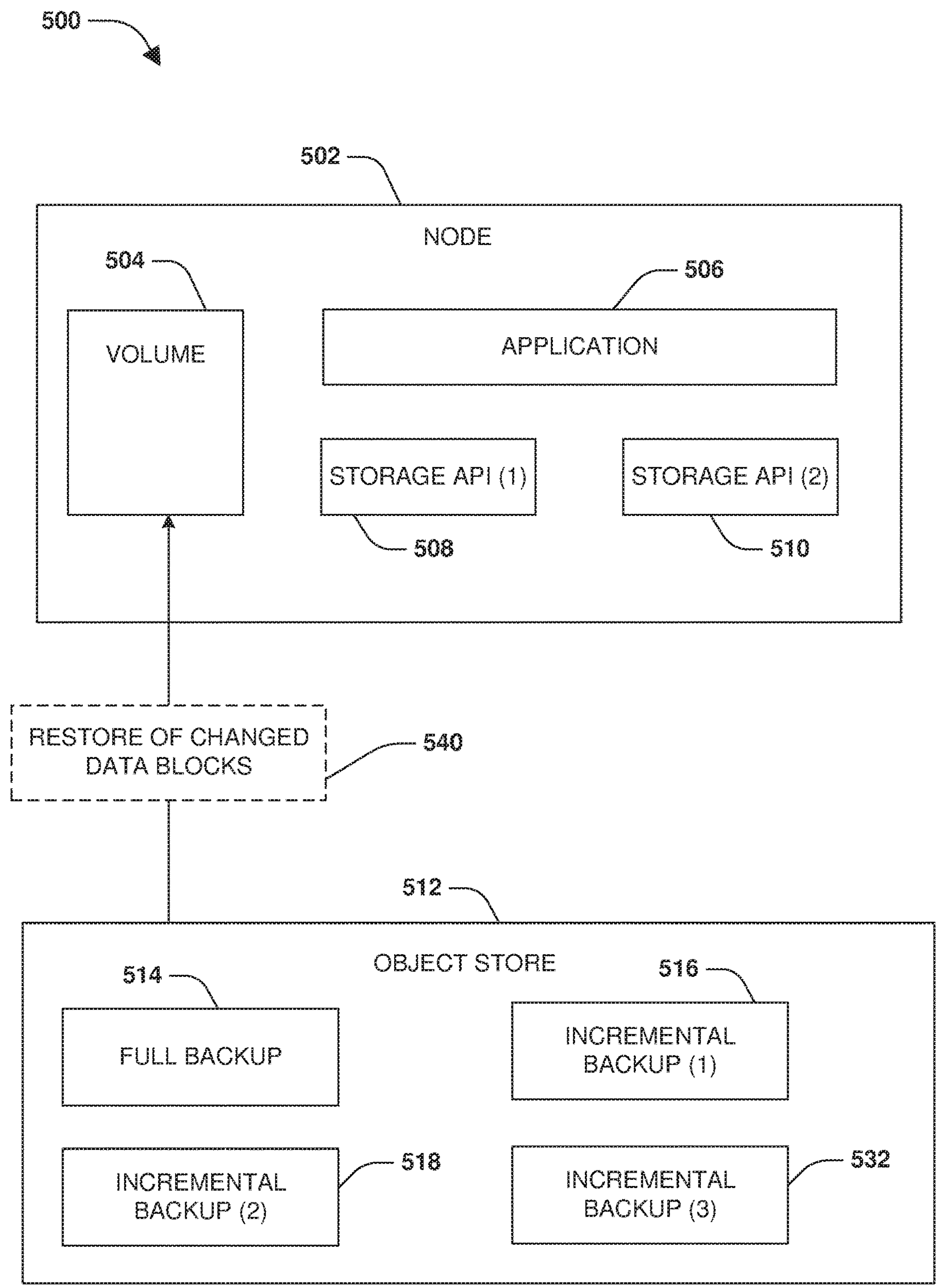
FIG. 5E is a block diagram illustrating an example system for incremental backup to object store, where a volume is restored using backup data within an object store.

In an embodiment, the application 506 may utilize the first storage API 508 and/or the second storage API 510 to perform a restore operation 540 to restore the volume 504 to a prior state by utilizing the backup data within the object store 512, as illustrated by FIG. 5E. As part of the restore operation 540, a restore relationship may be generated. The restore relationship may specify the volume 504 of the node 502 as the restore target. The restore relationship may specify the object store 512 as a restore source. When the restoration operation 540 is complete, then the restore relationship may be deleted (e.g., automatically deleted). In an example of the restore operation 540, the restore operation 540 may be performed at a volume level in order to place the volume 504 into a desired state represented by one or more backups. For example, if a restore state of the volume 504 corresponds to a representation of data within the volume 504 at which the second incremental backup 518 was created, then the full backup 514, the first incremental backup 516, and the second incremental backup 518 may be used to restore the volume 504 to the restore state.

In another example of the restore operation 540, a file level restore may be performed to restore a particular file within the volume 504 to a desired state represented by one or more backups. In an embodiment of the file level restore, a utility tool is utilized to browse files in the object store 512 in order to obtain an inode/inode number of the file to restore. The inode/inode number may be utilized to restore the file back to the volume 504 using backup data within the object store 512 identified using the inode/inode number. In an embodiment of the file level restore, a file list and an inode number within file metadata of the file are utilized to build a catalog. The catalog comprises a file path and the inode number of the file. The catalog, such as the file path and the inode number, are utilized to perform the file level restore to restore the file back to the volume 504 using backup data within the object store 512 identified using the file path and the inode number.

Various other types of commands may be performed with respect to backups (snapshots) maintained within the object store 512 for the volume 504 by the first storage API 508 and/or the second storage API 510. In an embodiment of a command that may be implemented with respect to the backups stored at the backup target within the object store 512, a list snapshot command may be implemented on behalf of the application 506 by the first storage API 508 and/or the second storage API 510. The list snapshot command may be used to identify one or more snapshots stored at the backup target within the object store 512, such as the full backup 514, the first incremental backup 516, the second incremental backup 518, and/or the third incremental backup 532 of the volume 504.

In an embodiment of a command that may be implemented with respect to the backups stored at the backup target within the object store 512, a delete snapshot command may be implemented on behalf of the application 506 by the first storage API 508 and/or the second storage API 510. The delete snapshot command may be implemented to delete a snapshot stored at the backup target within the object store 512, such as the full backup 514, the first incremental backup 516, the second incremental backup 518, and/or the third incremental backup 532 of the volume 504. In an embodiment of a command that may be implemented with respect to the backups stored at the backup target within the object store 512, a delete backup relationship command may be implemented on behalf of the application 506 by the first storage API 508 and/or the second storage API 510. The delete backup relationship command may be implemented to remove the backup relationship specifying the volume 504 of the node 502 as the backup source and the object store 512 and/or the backup target as the backup destination.

In an embodiment of a command that may be implemented with respect to the backups stored at the backup target within the object store 512, a delete endpoint command may be implemented on behalf of the application 506 by the first storage API 508 and/or the second storage API 510. The delete endpoint command may be performed to remove backup objects within the object store 512 pertaining the backup target. In an embodiment of a command that may be implemented with respect to the backups stored at the backup target within the object store 512, a delete object store command may be implemented on behalf of the application 506 by the first storage API 508 and/or the second storage API 510. The delete object store command may be implemented to remove any references from the node 502, the first storage API 508, and/or the second storage API 510 to the object store 512.

In an embodiment of a backup and restore life cycle provided by a first storage API and a second storage API for the application, a provider of the application may obtain an object store capacity license. The object store capacity license is installed on a cluster, such as a node that provides storage services to client devices. An API token, comprising an API license key, is provided to the provider of the application that manages backups from the cluster to the object store such as a cloud storage environment. The API token may be common to both the first storage API and the second storage API.

In order to perform a backup to the object store, a first post command with the object store as a target is invoked to add a backup target (a cloud target) to the object store. A second post command is invoked to create a backup policy (a mirroring policy) for the object store backup. A third post command is invoked to specify a volume of the cluster as a source and the object store as a destination. The third post command may include the API token, which upon validation, a backup relationship is created for backing up the volume as the source to the object store as the destination. The backup policy may be specified during the third post command or subsequently through a patch command. The patch command may be implemented to attach the backup policy to the object store (or to the backup relationship). The patch command may comprise the API token. A fourth post command, including the API token and a relationship identifier of the backup relationship specifying the volume as the source and the object store as the backup destination, may be performed to initialize or update a backup to the object store (e.g., perform a backup of the volume to the object store).

In order to perform a restore, a first post operation is invoked with a restore flag set to true and specifying an endpoint identifier of the object store (e.g., endpoint identifier of the backup target). The first post operation comprises the API token. In response to the API token being validated, a restore relationship is created. A second post command is performed to restore the volume. The second post command includes the API token and the relationship identifier of the restore relationship specifying the object store as a source and the volume as a destination of the restore relationship. Once the volume is restored, then the restore relationship is deleted. To do a file level restore, an inode number of the file has to be specified. In an example of the file level restore, the application obtains file metadata changes after each backup using the first storage API, and builds a catalog that contains the file path and inode number of a file to restore. In another example of the file level restore, a utility tool associated with the second storage API may be launched to browse files in the object store in order to obtain the inode number of the file to restore. In this way, the inode number and/or the file path are used to restore the file to the volume.

Other commands may be implemented for backups within the object store. In an example, a list snapshot command is performed. As part of the list snapshot command, a first get operation is performed to obtain the endpoint identifier of the object store (e.g., endpoint identifier of the backup target). A get snapshot list operation is performed using the endpoint identifier (e.g., endpoint identifier of the backup target) in order to obtain a list of snapshots within the object store. In another example, a delete snapshot command is performed. The endpoint identifier of the object store and a snapshot identifier of a snapshot to delete are used by a delete operation to delete the snapshot. In another example, a delete backup relationship command is performed. As part of the delete backup relationship command, a get operation is performed to obtain the endpoint identifier of the object store (e.g., endpoint identifier of the backup target). The get operation comprises the backup relationship identifier of the backup relationship to delete. A patch operation is performed using the relationship identifier and the API token to quiese or pause the transfer of backups to the object store. A delete operation comprising the backup relationship identifier is performed to delete the backup relationship. Once the backup relationship is deleted, there may be no option provided by a storage operating system of the node to obtain the endpoint identifier (e.g., endpoint identifier of the backup target). Thus, the application has to obtain the endpoint identifier and store the endpoint identifier within persistent storage in order to subsequently restore from that endpoint and/or to delete the endpoint.

In another example, a delete endpoint command may be performed. As part of the delete endpoint command, a delete operation comprising an object store identifier of the object store and the endpoint identifier of the endpoint (the backup target) is performed to delete all backup objects in the object store pertaining to that endpoint (e.g., delete snapshots/backups that were backed up to the backup target). In another example, a delete object store command may be performed to remove references within the storage operating system of the node to the object store. As a prerequisite of performing the delete object store command, all backup relationships to the object store should have been deleted. However, all endpoints (backup targets) within the object store do not have to be first deleted. Accordingly, a delete operation specifying the identifier of the object store is performed to delete any references to the object store from the storage operation system of the node.

Figure 6:
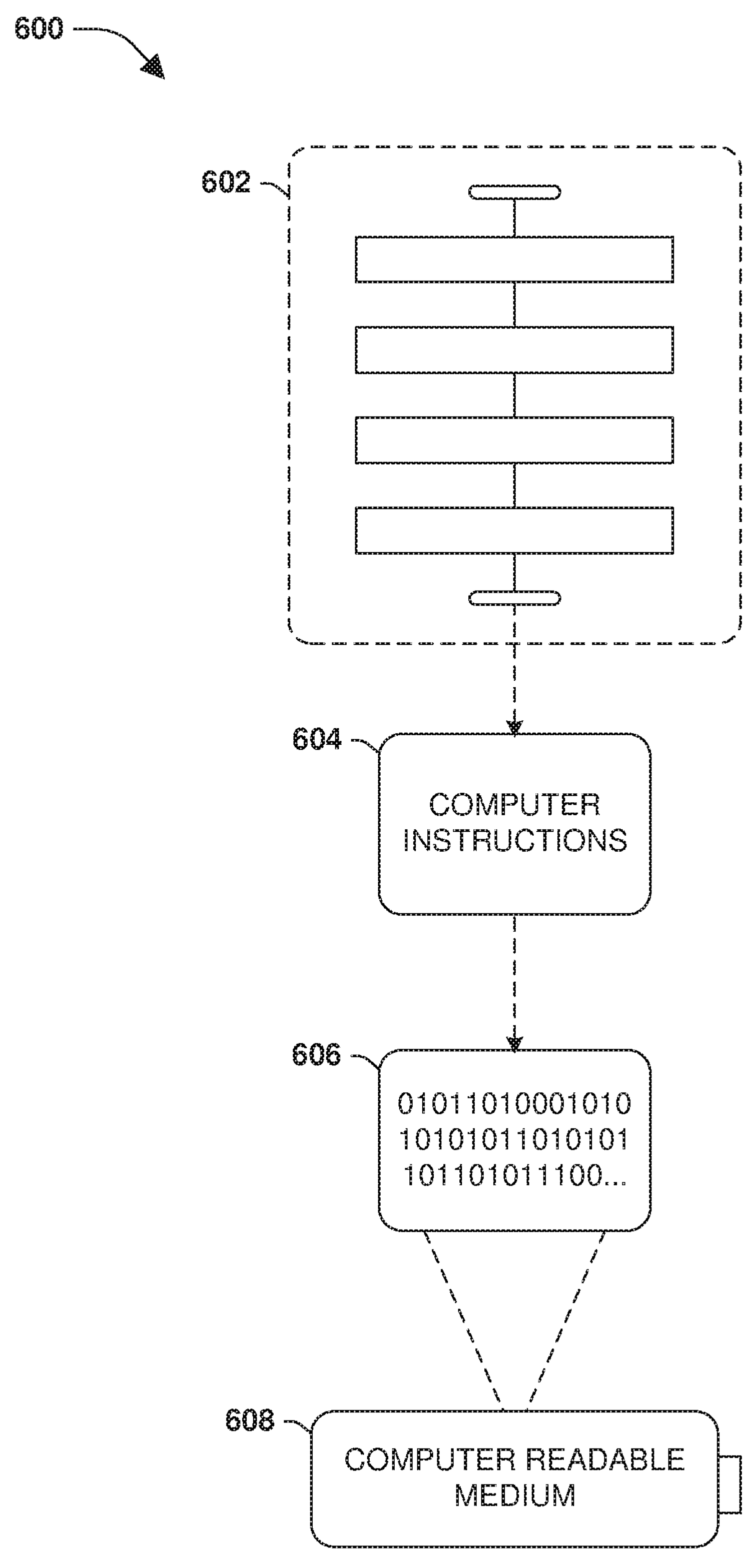
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5E, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

generating a backup policy for an object store, wherein the backup policy comprises backup attributes for backing up data from a node to the object store, wherein the backup attributes comprise at least one of a schedule for executing backup operations or a number of backup copies to retain within the object store;

generating an application programming interface (API) token that provides an application with the ability to initiate backup and restore operations of a volume hosted by the node, wherein the API token is generated to include a signature used to determine whether the API token has been tampered with;

receiving, by a storage API of the node, a request from the application to perform a backup from the volume to a backup target within the object store, wherein the object store is hosted by a third party cloud storage provider that is remote to the node, and wherein the application comprise a third party backup application that is provided with access to a storage operating system of the node through the storage API;

performing a validation upon the API token within the request to determine whether the application has permission to invoke the storage API to orchestrate the backup to the object store, and wherein the validation verifies the signature before allowing the backup to be performed on behalf of the application;

isolating the application from accessing data within the volume, wherein the storage API performs the backup on behalf of the application;

identifying, by the storage API, a set of changed files within the volume since a prior backup of the volume was performed to the backup target;

utilizing, by the storage API, inodes associated with the set of changed files to identify changed data blocks comprising data of the set of changed files that were modified since the prior backup; and backing up, by the storage API based upon the backup policy and in response to validating the API token, the changed data blocks to the object store on behalf of an application external to the backup target and the object store, wherein the changed data blocks are backed up using backup streams and credentials of the object store, wherein the storage API is disassociated with the backup streams and credentials.

2. The method of claim 1, comprising:

generating the API token to comprise licensing information granting the application with access to the storage API, a user name, and a flag to indicate whether the user is exempt from being required to have a separate backup capacity license.

3. The method of claim 1, comprising:

in response to determining that the API token is invalid based upon the verification failing to verify the signature, refraining, by storage API, from performing the backup on behalf of the application.

4. The method of claim 1, comprising:

tracking whether the API token is valid or invalid within a log.

5. The method of claim 1, wherein the metadata comprises inode numbers of the changed files in the set of changed files.

6. The method of claim 1, wherein the backing up comprises:

reading, by the storage API, the changed data blocks from storage managed by the node.

7. The method of claim 6, wherein the backing up comprises:

transmitting, by the storage API, the changed data blocks to the object store for storage within the backup target.

8. The method of claim 1, wherein the set of changed files and the metadata is identified by the storage API external to the application, wherein the metadata corresponds to a subset of metadata relating to file level information for the set of changed files, wherein the file level information comprises file identifiers and file names.

9. A non-transitory machine readable medium comprising instructions for performing a method, which when executed by a machine, causes the machine to:

generate a backup policy for an object store, wherein the backup policy comprises backup attributes for backing up data from a node to the object store, wherein the backup attributes comprise at least one of a schedule for executing backup operations or a number of backup copies to retain within the object store;

generate an application programming interface (API) token that provides an application with the ability to initiate backup and restore operations of a volume hosted by the node, wherein the API token is generated to include a signature used to determine whether the API token has be en tampered with;

receive, by a storage API of the node, a request from the application to perform a backup from the volume to a backup target within the object store, wherein the object store is hosted by a third party cloud storage provider that is remote to the node, and wherein the application comprise a third party backup application that is provided with access to a storage operating system of the node through the storage API;

perform a validation upon the API token within the request to determine whether the application has permission to invoke the storage API to orchestrate the backup to the object store, and wherein the validation verifies the signature before allowing the backup to be performed on behalf of the application;

isolate the application from accessing data within the volume, wherein the storage API performs the backup on behalf of the application;

identify, by the storage API, a set of changed files within the volume since a prior backup of the volume was performed to the backup target;

utilize, by the storage API, inodes associated with the set of changed files to identify changed data blocks comprising data of the set of changed files that were modified since the prior backup; and backup, by the storage API based upon the backup policy and in response to validating the API token, the changed data blocks to the object store on behalf of an application external to the backup target and the object store, wherein the changed data blocks are backed up using backup streams and credentials of the object store, wherein the storage API is disassociated with the backup streams and credentials.

10. The non-transitory machine readable medium of claim 9, wherein the instructions cause the machine to:

perform a restore operation to restore the volume to a prior state utilizing backup data within the object store.

11. The non-transitory machine readable medium of claim 10, wherein the instructions cause the machine to:

generate a restore relationship specifying the volume as a restore target and the object store as a restore source, wherein the restore relationship is deleted in response to the restore operation completing.

12. The non-transitory machine readable medium of claim 9, wherein the instructions cause the machine to:

perform a file level restore of a file from backup data within the object store to the volume, wherein a utility tool is utilized to browse files in the object store to obtain an inode number of the file to use for performing the file level restore.

13. The non-transitory machine readable medium of claim 9, wherein the instructions cause the machine to:

perform a file level restore of a file from backup data within the object store to the volume, wherein a file list and an inode number within metadata of the file are utilized to build a catalog comprising a file path and the inode number of the file to use for performing the file level restore, wherein the file list and inode number are reported to the application.

14. A computing device comprising:

a memory comprising machine executable code for performing a method; and a processor coupled to the memory, the processor configured to execute the machine executable code to cause the processor to:

generate a backup policy for an object store, wherein the backup policy comprises backup attributes for backing up data from a node to the object store, wherein the backup attributes comprise at least one of a schedule for executing backup operations or a number of backup copies to retain within the object store;

generate an application programming interface (API) token that provides an application with the ability to initiate backup and restore operations of a volume hosted by the node, wherein the API token is generated to include signature used to determine whether the API token has been tampered with;

receive, by a storage API of the node, a request from the application to perform a backup from the volume to a backup target within the object store, wherein the object store is hosted by a third party cloud storage provider that is remote to the node, and wherein the application comprise a third party backup application that is provided with access to a storage operating system of the node through the storage API;

perform a validation upon the API token within the request to determine whether the application has permission to invoke the storage API to orchestrate the backup to the object store, and wherein the validation verifies the signature before allowing the backup to be performed on behalf of the application isolate the application from accessing data within the volume, wherein the storage API performs the backup on behalf of the application;

identify, by the storage API, a set of changed files within the volume since a prior backup of the volume was performed to the backup target;

utilize, by the storage API, inodes associated with the set of changed files to identify changed data blocks comprising data of the set of changed files that were modified since the prior backup; and backup, by the storage API based upon the backup policy and in response to validating the API token, the changed data blocks to the object store on behalf of an application external to the backup target and the object store, wherein the changed data blocks are backed up using backup streams and credentials of the object store, wherein the storage API is disassociated with the backup streams and credentials.

15. The computing device of claim 14, wherein the machine executable code causes the processor to:

perform a list snapshot command to identify one or more snapshots stored at the backup target of the object store, wherein the one or more snapshots correspond to at least one of a full backup or an incremental backup of the volume.

16. The computing device of claim 14, wherein the machine executable code causes the processor to:

perform a delete snapshot command to delete a snapshot stored at the backup target of the object store, wherein the snapshot corresponds to at least one of a full backup or an incremental backup of the volume.

17. The computing device of claim 14, wherein the machine executable code causes the processor to:

perform a delete backup relationship command to remove a backup relationship specifying the volume as a backup source and the object store as a backup destination.

18. The computing device of claim 14, wherein the machine executable code causes the processor to:

perform at least one of a delete endpoint command to remove backup objects in the object store pertaining to the backup target or a delete object store command to remove a reference of the object store from the node.

* * * * *